(12) United States Patent
Choi et al.

(10) Patent No.: US 6,235,079 B1
(45) Date of Patent: May 22, 2001

(54) TWO STEP TWIN-SINGLE FLUIDIZED BED PRE-REDUCTION APPARATUS FOR PRE-REDUCING FINE IRON ORE, AND METHOD THEREFOR

(75) Inventors: Nag Joon Choi; Sun Kwang Jeong; Uoo Chang Jung; Heung Won Kang, all of Kyungsangbook-do (KR)

(73) Assignees: Pohang Iron & Steel Co., Ltd.; Research Institute of Industrial Science & Technology, both of (KR); Voest-Alpine Industrieanlagenbau GmbH (AT)

( * ) Notice: Subject to any disclaimer, the term of this patent is extended or adjusted under 35 U.S.C. 154(b) by 0 days.

(21) Appl. No.: 09/367,902
(22) PCT Filed: Dec. 16, 1998
(86) PCT No.: PCT/KR98/00433
§ 371 Date: Aug. 19, 1999
§ 102(e) Date: Aug. 19, 1999
(87) PCT Pub. No.: WO99/32666
PCT Pub. Date: Jul. 1, 1999

(30) Foreign Application Priority Data

Dec. 20, 1997 (KR) .................................................. 97-71435

(51) Int. Cl.$^7$ .................................................. C21B 11/00
(52) U.S. Cl. .............................................. 75/444; 266/172
(58) Field of Search ............................. 266/172; 75/444, 75/445, 446, 450

(56) References Cited

U.S. PATENT DOCUMENTS

| | | | |
|---|---|---|---|
| 5,785,733 | * 7/1998 | Lee et al. .............................. | 75/444 |
| 5,897,829 | * 4/1999 | Kim et al. .............................. | 266/172 |
| 5,919,281 | * 7/1999 | Park et al. .............................. | 75/450 |
| 5,961,690 | * 10/1999 | Kepplinger et al. .................. | 266/172 |

FOREIGN PATENT DOCUMENTS

| | | |
|---|---|---|
| 0081002 | 9/1994 | (KR) . |
| 96-21044 | 7/1996 | (WO) . |
| 96-210446 | 7/1996 | (WO) . |
| 97-23655 | 7/1997 | (WO) . |
| 97-24463 | 7/1997 | (WO) . |

* cited by examiner

*Primary Examiner*—Scott Kastler
(74) *Attorney, Agent, or Firm*—Webb Ziesenheim Logsdon Orkin & Hanson, P.C.

(57) ABSTRACT

A two step twin-single fluidized bed type reduction apparatus for fine iron ore, and a method therefor, are disclosed. The fluidizing of the fine iron ore is stabilized so as to improve the reduction degree and the gas utilization rate, and so as to minimize the elutriation loss of the iron ore. The apparatus includes a first fluidized bed furnace for carrying out a first pre-reduction on only coarse/intermediate iron ore particles among fine iron ores of a wide particle size distribution by a bubbling/turbulent fluidization after their charge from a charging hopper, while making fine iron ore particles fly away. A second fluidized bed furnace carries out a first pre-reduction on the fine iron ore particles flown from the first fluidized bed furnace by a bubbling fluidization, and a third fluidized bed furnace carries out a second pre-reduction on the iron ores discharged from the first and second fluidized bed furnaces after their first pre-reduction. A first cyclone captures extremely fine iron ore particles from an off-gas discharged from the second fluidized bed furnace to circulate them back to the second fluidized bed furnace. A second cyclone captures extremely fine iron ore particles from an off-gas discharged from the third fluidized bed furnace to circulate them back to the third fluidized bed furnace. A gas reforming system reforms a part of the off-gas of the first cyclone to circulate the reformed gas to the first and second fluidized bed furnaces.

6 Claims, 2 Drawing Sheets

PRIOR ART

TWO STEP TWIN-SINGLE FLUIDIZED BED PRE-REDUCTION APPARATUS FOR PRE-REDUCING FINE IRON ORE, AND METHOD THEREFOR

FIELD OF THE INVENTION

The present invention relates to a fluidized bed type pre-reduction furnace for pre-reducing a fine iron ore to produce molten iron, and a pre-reduction method, in a smelting reduction ironmaking process. More specifically, the present invention relates to a two step twin-single fluidized bed type pre-reduction furnace, and a method for pre-reducing fine iron ores, in which the elutriation loss of fine particles can be minimized during the reduction of the fine iron ores with a wide size distribution.

BACKGROUND OF THE INVENTION

In present day molten iron production lines, the blast furnace iron making process represents the predominant method. Recently, the smelting reduction ironmaking process with shaft type reduction furnace using the pellets and lump ores has been commercialized to produce molten iron. However, the above two processes have the restriction that only agglomerated raw materials can be used.

In the blast furnace ironmaking process, a sintered ore is employed which is made by mixing coke (made from coal), plus fine iron ores and flux, thereby producing a molten iron. In this method, facilities for the pre-treatment of the raw material are required, and in this connection, the environmental pollution problem has become serious. Thus, regarding this matter, environmental regulation has been imposed.

Meanwhile, in the shaft type smelting reduction ironmaking process, pellets and/or lump ores are used to produce molten iron. Thus in the blast furnace ironmaking process or in the shaft type smelting reduction ironmaking process, fine iron ores cannot be directly used, but a pre-treatment has to be carried out. Therefore, the fluidized bed type smelting reduction ironmaking process has gained attention as a means to replace the existing blast furnace ironmaking process, because the fluidized bed type smelting reduction ironmaking process can directly use fine iron ores which are cheap and abundant. Furthermore, it can lower the investment costs and environmental pollution by removing the raw material pre-treatment facilities. Therefore, studies on the fluidized bed type smelting reduction ironmaking process are being briskly pursued.

The smelting reduction ironmaking process is divided into a pre-reduction stage and a final reduction stage. At the pre-reduction stage, the raw ores are pre-reduced into a solid state, while at the final reduction stage, the pre-reduced iron is put into a melting furnace to produce a finally reduced pig iron. Generally, the pre-reduction stage is classified into a moving bed type and a fluidized bed type. It is known that the fluidized bed type is advantageous in the case of a fine iron ore, because the fluidized bed type smelting reduction ironmaking process pre-reduces the raw iron ore by means of the reducing gas within the reduction furnace. That is, the fluidized bed type smelting reduction ironmaking process is efficient in permeability and gas utilization.

FIG. 1 illustrates a conventional fluidized bed type pre-reduction apparatus, which is disclosed in Korean Patent No. 81002.

As shown in FIG. 1, the conventional fluidized bed type pre-reduction apparatus includes: a first pre-reduction furnace 10 disposed above, twin type second and third pre-reduction furnaces 20 and 30 disposed below, cyclones 40, 50 and 60, and circulation pipes 15, 24, 41, 51 and 61. In the first pre-reduction furnace 10, a raw fine iron ore which has been charged through a charging hopper 70 forms a bubbling fluidization by the help of an off-gas of the third cyclone 60. Then the fine iron ore undergoes drying and pre-heating steps to be supplied through the second circulation pipe 15 to the second pre-reduction furnace 20. Within the second pre-reduction furnace 20, the intermediate and fine iron ore particles among the first pre-reduced iron ore of the first pre-reduction furnace fly to the third pre-reduction furnace 30, while only the coarse iron ore particles form bubbling/turbulent fluidization to be pre-reduced for the second time. In the third pre-reduction furnace 30, the first pre-reduced intermediate/fine iron ores which have been flown from the second pre-reduction furnace 20 through the fourth circulation pipe 24 form a high speed fluidization to be reduced for the second time. The fine iron ore particles which have been flown from the first pre-reduction furnace are collected by the first cyclone 40 to be circulated through the first circulation pipe 41 into the second pre-reduction furnace. The fine iron ore particles which have been flown from the third pre-reduction furnace are collected by the second cyclone 50 to be circulated through the fifth circulation pipe 51 partly to the third pre-reduction furnace and partly to be discharged to a fifth outlet 52. The fine iron ore which has not been captured by the second cyclone is collected by the third cyclone 60 to be circulated through the third circulation pipe 61 (connected to the first circulation pipe) to the second pre-reduction furnace. The iron ores which have been pre-reduced in the second and third pre-reduction furnaces for the second time are discharged respectively through a third outlet 23 and a fourth outlet 33.

In FIG. 1, reference numerals 12, 22 and 32 indicate gas distributors, and 11, 21 and 31 indicate gas inlets.

However, in the conventional fluidized bed type pre-reduction furnace of FIG. 1, the fine iron ore which has not been captured by the first cyclone 40 is discharged through the gas discharge conduit 42, with the result that the elutriation loss of the iron ore is very large.

Particularly, during the pre-reduction of the iron ore, the powderizing phenomenon occurs mostly at the early stage of the reduction. Therefore, a large amount of fine iron ore is scattered after it is powderized during the first pre-reduction by the first pre-reduction furnace 10 and after the mechanical powderizing caused by the fluidizing. Thus the first cyclone is overloaded, and therefore, the separation of the iron ore from the off-gas is inhibited, with the result that a large amount of fine iron ore is discharged together with the off-gas, thereby increasing the iron ore loss.

SUMMARY OF THE INVENTION

The present invention is intended to overcome the above described disadvantages of the conventional techniques. In order to overcome the above described disadvantages of the conventional techniques, the present inventors have carried out studies and researches for a long time, and based on the studies and researches, the present investors came to propose the apparatus of the present invention.

Therefore it is an object of the present invention to provide a two step twin-single fluidized bed type fine iron ore pre-reduction apparatus, and a method therefor, in which the fluidizing of the fine iron ore is stabilized so as to improve the degree of reduction and gas utilization, so as to minimize the elutriation loss of the iron ore.

In achieving the above object, the two step fluidized bed type pre-reduction apparatus for pre-reducing a fine iron ore according to the present invention includes: a first fluidized bed furnace for carrying out a first pre-reduction on only coarse/intermediate iron ore particles among fine iron ores of a wide particle size distribution by a bubbling/turbulent fluidization after their charge from a charging hopper, while making fine iron ore particles fly away; a second fluidized bed furnace for carrying out a first pre-reduction on the fine iron ore particles flown from the first fluidized bed furnace by a bubbling fluidization; a third fluidized bed furnace for carrying out a second pre-reduction on the iron ore discharged from the first and second fluidized bed furnaces after their first pre-reduction; a first cyclone for capturing extremely fine iron ore particles from an off-gas discharged from the second fluidized bed furnace to circulate them back to the second fluidized bed furnace; a second cyclone for capturing extremely fine iron ore particles from an off-gas discharged from the third fluidized bed furnace to circulate them back to the third fluidized bed furnace; and a gas reforming system for reforming a part of the off-gas of the first cyclone to circulate the reformed gas to the first and second fluidized bed furnaces.

In the method for pre-reducing a fine iron ore using a two-step fluidized bed type pre-reduction apparatus, the gas velocity within the first fluidized bed furnace is 1.2–3.5 times as high as the minimum fluidization velocity of the iron ore staying within the furnace. Further, the gas velocity within the second and third fluidized bed furnaces is 1.2–2.5 times as high as the minimum fluidization velocity of the iron ore staying within the furnaces.

BRIEF DESCRIPTION OF THE DRAWINGS

The above object and other advantages of the present invention will become more apparent by describing in detail the preferred embodiment of the present invention with reference to the attached drawings in which.

DETAILED DESCRIPTION OF THE PREFERRED EMBODIMENT

Figure 1:
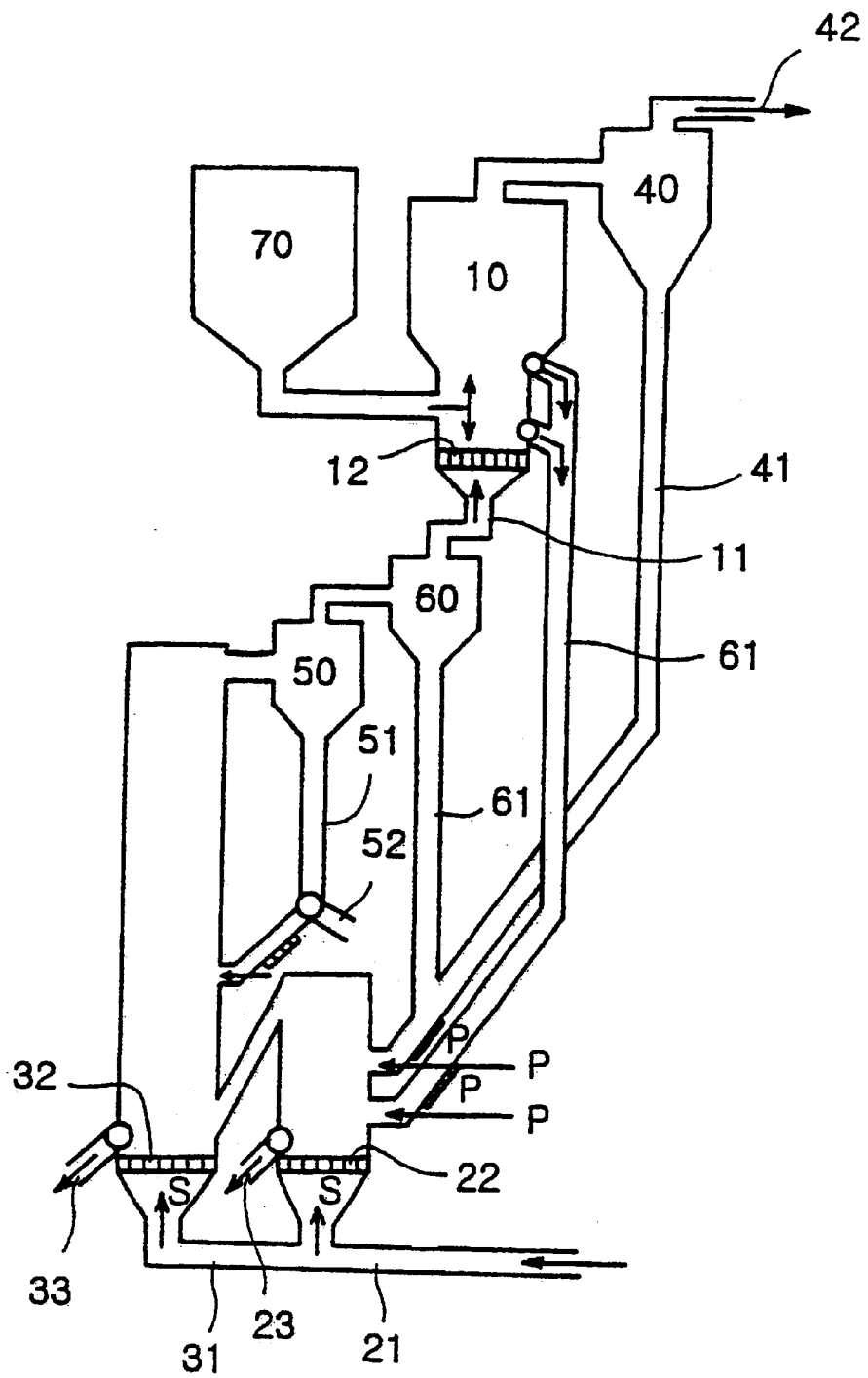
FIG. 1 illustrates the conventional fluidized bed type pre-reduction apparatus for pre-reducing a fine iron ore.
Figure 2:
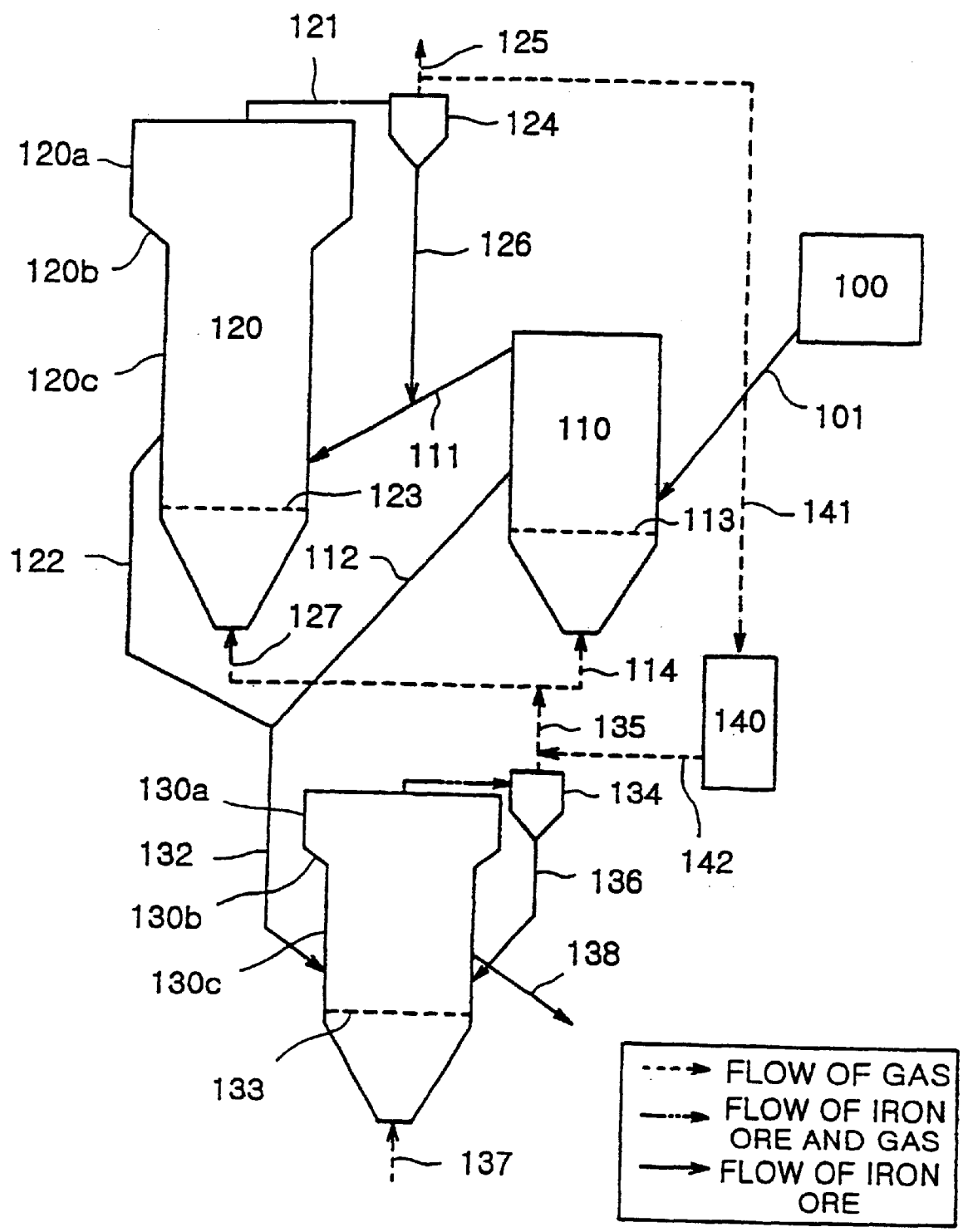
FIG. 2 illustrates the two-step fluidized bed type pre-reduction apparatus for pre-reducing a fine iron ore according to the present invention.

As shown in FIG. 2, the two-step fluidized bed type pre-reduction apparatus for pre-reducing a fine iron ore according to the present invention includes: a first fluidized bed furnace 110 for carrying out a first pre-reduction for only coarse/intermediate iron ore particles among fine iron ores of a wide particle size distribution by a bubbling or turbulent fluidization after their charge from a charging hopper 100 through a first charging pipe 101, while making fine iron ore particles fly away; a second fluidized bed furnace 120 for carrying out a first pre-reduction for the fine iron ore particles flown from the first fluidized bed furnace 110 by a bubbling fluidization; a third fluidized bed furnace 130 for carrying out a second pre-reduction for the iron ore discharged from the first and second fluidized bed furnaces 110 and 120 after their first pre-reduction; a first cyclone 124 for capturing extremely fine iron ore particles from an off-gas discharged from the second fluidized bed furnace 120 to circulate them back to the second fluidized bed furnace 120; a second cyclone 134 for capturing extremely fine iron ore particles from an off-gas discharged from the third fluidized bed furnace 130 to circulate them back to the third fluidized bed furnace 130; and a gas reforming system 140 for reforming a part of the off-gas of the first cyclone 124 to circulate the reformed gas to the first and second fluidized bed furnaces 110 and 120.

The first fluidized bed furnace 110 is cylindrical, and a first gas distributor 113 is installed in the lower portion of it. A first reducing gas supply pipe 114 is connected to the bottom of the first fluidized bed furnace 110, for supplying the off-gas of the third fluidized bed furnace 130 to use the gas as the reducing gas.

Further, a first charging pipe 101 is connected to a side wall of the first fluidized bed furnace 110, for supplying a fine iron ore and a flux such as lime stone from the charging hopper 100. Further, a first discharge pipe 112 is connected to the side wall of the furnace 110, for discharging the pre-reduced intermediate/coarse iron ore particles. Further, a first circulation pipe 111 is connected to the same side wall of the furnace 110 for discharging/circulating the pre-reduced fine iron ore particles.

The second fluidized bed furnace 120 consists of an expanded portion 120a, a tapered portion 120b and a narrow portion 120c.

Within the lower portion of the narrow portion 130c, there is installed a second gas distributor 123. A second reducing gas supply pipe 127 is connected to the bottom of the second fluidized bed furnace 120, for supplying an off-gas of the third fluidized bed furnace 130 to use it as a reducing gas.

Further, the first circulation pipe 111 is connected to a side wall of the narrow portion 120c of the second furnace 120, for supplying discharged fine ore from the first fluidized bed furnace, and for supplying fine iron ore particles from the first cyclone 124. Further, a second discharge pipe 122 is connected to the side wall of the narrow portion 120c, for discharging a pre-reduced fine iron ore.

The expanded portion 120a is connected through a first off-gas discharging pipe 121 to the first cyclone 124.

A second circulation pipe 126 is connected to the bottom of the first cyclone 124, for circulating fine iron ore particles back to the second fluidized bed furnace 120. Further, a second off-gas discharging pipe 125 is connected to the top of the first cyclone 124.

Further, the second circulation pipe 126 is connected to the first circulation pipe 111.

The third fluidized bed furnace 130 includes an expanded portion 130a, a tapered portion 130b and a narrow portion 130c.

Within the lower portion of the narrow portion 130c, there is installed a third gas distributor 133. Further, a third reducing gas supply pipe 137 is connected to the bottom of the third fluidized bed furnace 130, for supplying a reducing gas.

Further, a second charging pipe 132 is connected to a side wall of the narrow portion 130c, for supplying a first pre-reduced iron ore from the first and second fluidized bed furnaces 110 and 120, while a reduced iron discharging pipe 138 is connected to the same side wall, for discharging a finally reduced iron.

The second charging pipe 132 communicates to both the first discharging pipe 112 of the first fluidized bed furnace 110 and to the second discharging pipe 122 of the second fluidized bed furnace 120.

The expanded portion 130a is connected through a third off-gas discharging pipe 131 to the second cyclone 134.

A third circulation pipe 136 is connected to the bottom of the second cyclone 134, for circulating fine iron ore particles back to the third fluidized bed furnace 130. A fourth off-gas discharging pipe 135 is connected to the top of the second cyclone 134, for discharging a gas after its separation from the fine iron ore particles. The fourth off-gas discharging 135 communicates to both a first gas supply pipe 114 of the first fluidized bed furnace 110 and to a second gas supply pipe 127 of the second fluidized bed furnace 120.

Meanwhile, the gas reforming system 140 communicates through a reformed gas supplying pipe 142 to the fourth off-gas discharging pipe 135, and communicates through an off-gas circulation pipe 141 to the second off-gas pipe 125.

The first fluidized bed furnace 110 should preferably have a height 10–20 times as big as its inside diameter. The reason is as follows. That is, if its height is less than 10 times as big as its inside diameter, the fluidizing of the iron ore within the furnace cannot be smoothly carried out, with the result that even the intermediate/coarse iron ore particles are flown to be sent to the second fluidized bed furnace. On the other hand, if its height is more than 20 times as big as its inside diameter, then the flight of the fine iron ore particles cannot be efficiently carried out.

Meanwhile, the inside diameters of the narrow portions 120c and 130c of the second and third fluidized bed furnaces 120 and 130 are just as large as the inside diameters of the bottoms of the tapered portions 120b and 130b. The inside diameters of the expanded portions 120a and 130a are just as large as the inside diameters of the tops of the tapered portions 120b and 130b.

The inside diameters of the expanded portions 120a and 130a should be preferably 1.5–2.0 times as large as the inside diameters of the narrow portions, so that the gas velocity can be reduced within the furnaces while lowering the elutriation loss of the fine iron ore.

The overall heights of the second and third fluidized bed furnaces 120 and 130 should be preferably 15–25 times as large as the inside diameters of the narrow portions, so that a sufficient fluidizing space can be secured, and that the elutriation loss of the fine iron ore can be lowered. The height of the narrow portion 120c and 130c should be preferably 1.0–1.5 times as large as the heights of the expanded portions 120a and 130a.

Now the method for pre-reducing the fine iron ore by using the two-step fluidized bed pre-reduction apparatus ill be described.

A fine iron ore is charged from the charging hopper 100 through the first charging pipe 101 into the first fluidized bed furnace 110. Of this fine iron ore, the fine iron ore particles are flown away, while the intermediate/coarse iron ore particles form a bubbling/turbulent fluidization within the first fluidized bed furnace 110 by the action of the gas which has been introduced through the first gas supply pipe 114 and has passed through the first gas distributor 113.

The gas velocity within the first fluidized bed furnace 110 should be 1.2–3.5 times as high as the minimum fluidization velocity of the iron ore staying within the furnace, so that the fine and intermediate/coarse iron ore particles can be efficiently separated and fluidized.

The fine iron ore particles(which have been flown from the first fluidized bed furnace 110 to be charged through the first circulation pipe 111 into the second fluidized bed furnace 120) form a bubbling fluidization by a reducing gas from the second gas supply pipe 127 and by the gas (loaded with the iron ore) from the first fluidized bed furnace 110. Thus these fine iron ore particles undergo a first pre-reduction. The extremely fine iron ore particles which have been flown together with the off-gas from the second fluidized bed furnace 120 are separated from the gas by the first cyclone 124 to be circulated through the second circulation pipe 126 and the first circulation pipe 111 back to the second fluidized bed furnace 120.

Meanwhile, the off-gas which has been separated from the iron ore by the first cyclone 124 is mostly discharged out through the off-gas discharging pipe 125. Some parts of it are circulated through the off-gas circulation pipe 141 to the gas reforming system 140 to be reformed. After the reforming, the gas is supplied through the reformed gas supplying pipe 142 to the first and second fluidized bed furnaces 110 and 120.

The iron ore which has been pre-reduced for the first time by the first and second fluidized bed furnaces 110 and 120 is merged together after their discharge through the first and second discharge pipes 112 and 122. Then the mixed iron ore is charged through the second charging pipe 132 into the third fluidized bed furnace 130 to form a bubbling fluidization so as to be pre-reduced for the second time by a reducing gas which has been introduced through the third gas supply pipe 137.

The gas velocity within the second and third fluidized bed furnaces 120 and 130 should be preferably 1.2–2.5 times as high as the minimum fluidization velocity of the iron ore staying within the furnaces.

The extremely fine iron ore particles which have been flown that is, carried in the off-gas from the third fluidized bed furnace 130, are separated from the gas by the second cyclone 134 to be circulated through the third circulation pipe 136 back to the third fluidized bed furnace. The separated off-gas is supplied through the fourth off-gas discharging pipe 135 to the first and second fluidized bed furnaces 110 and 120 so as to be used as a reducing and fluidizing gas.

Meanwhile, the iron ore which has been pre-reduced for the second time by the third fluidized bed furnace 130 is finally discharged through the discharge pipe 138 to be charged into a melting furnace so as to be manufactured into a molten iron.

Now the present invention will be described based on an actual example.

EXAMPLE

The reduction apparatus of FIG. 2 was used, and the sizes of the fluidized bed furnaces were as shown in Table 1. The chemical composition and the particle size distribution were as shown in Tables 2 and 3, and the conditions of Tables 4 and 5 were adopted in carrying out the reducing experiments.

TABLE 1

Inside diameters and heights of the fluidizing bed type furnaces

| Furnace | Size |
| --- | --- |
| First furnace | Inside diameter: 0.2 m |
|  | Height: 4.0 m |
| Second furnace | ID of narrow portion: 0.4 m |
|  | ID of expanded portion: 0.8 m |
|  | Height of narrow portion: 3.5 m |
|  | (above the dispersing plate) |
|  | Height of expanded portion: 3.5 m |
|  | (from bottom of tapered portion) |
| Third furnace | ID of narrow portion: 0.3 m |
|  | ID of expanded portion: 0.6 m |
|  | Height of narrow portion: 3 m |
|  | (above the dispersing plate) |
|  | Height of expanded portion: 3 m |
|  | (from bottom of tapered portion) |

TABLE 2

Chemical composition of raw iron ore

| Ingredient | T.Fe | FeO | SiO$_2$ | Al$_2$O$_3$ | Mn | S | P | Moisture |
|---|---|---|---|---|---|---|---|---|
| wt % | 63.49 | 0.37 | 4.32 | 2.33 | 0.05 | 0.007 | 0.063 | 5.41 |

TABLE 3

Particle size distribution of raw iron ore

| Pcl size | <0.125 | 0.25–0.125 | 0.5–0.25 | 1–0.5 | 3–1 | 5–3 | 8–5 |
|---|---|---|---|---|---|---|---|
| wt % | 15.0 | 10.2 | 10.1 | 10.2 | 23.9 | 18.6 | 12.0 |

TABLE 4

Conditions of reducing gas

| | |
|---|---|
| Gas composition: | CO: 65%, CO$_2$: 5%, H$_2$: 25%, N$_2$: 5% |
| Temperature: | 750–850° C. |
| Pressure: | 1.5–2.0 Kgf/cm$^2$ |

TABLE 5

Gas flow within the fluidized bed furnaces

| Furnace | Magnitude |
|---|---|
| First furnace | Flow velocity: 4.0 m/s |
| Second furnace | Flow velocity in narrow portn: 0.4 m/s |
| | Flow velocity in expanded portn: 0.1 m/s |
| Third furnace | Flow velocity in narrow portn: 2.0 m/s |
| | Flow velocity in expanded portn: 0.5 m/s |

Reduction experiments were carried out at the conditions of the above tables. Then it was found that the reduced iron was discharged at 60 minutes after the charging of the iron ore from the hopper into the first fluidized bed furnace. The average reduction degree was 88–92%, and a uniform reduction could be obtained regardless of the particle sizes. The average gas utilization rate was 30–32%, and the gas consumption rate was 1250–1350, while the flight rate was 5–7%. Thus a good result was obtained.

According to the present invention as described above, a fine iron ore having a wide particle size distribution can be reduced more efficiently with less elutriation loss compared with the conventional two step single-twin fluidized bed type pre-reduction apparatus.

What is claimed is:

1. A two-step fluidized bed pre-reduction apparatus for pre-reducing a fine iron ore having a wide particle size distribution, comprising:

a first fluidized bed furnace for carrying out a first pre-reduction on only coarse/intermediate iron ore particles among fine iron ores of a wide particle size distribution by a bubbling/turbulent fluidization after their charge from a charging hopper through a first charging pipe, while making fine iron ore particles fly away;

a second fluidized bed furnace for carrying out a first pre-reduction on the fine iron ore particles flown from said first fluidized bed furnace by a bubbling fluidization;

a third fluidized bed furnace for carrying out a second pre-reduction on the iron ore discharged from said first and second fluidized bed furnaces after their first pre-reduction;

a first cyclone for capturing extremely fine iron ore particles from an off-gas discharged from said second fluidized bed furnace to circulate said extremely fine iron ore particles back to said second fluidized bed furnace;

a second cyclone for capturing extremely fine iron ore particles from an off-gas discharged from said third fluidized bed furnace to circulate said extremely fine iron ore particles back to said third fluidized bed furnace;

a gas reforming system for reforming a part of the off-gas of said first cyclone to circulate the reformed gas to said first and second fluidized bed furnaces;

said first fluidized bed furnace being cylindrically shaped; a first gas distributor installed in a lower portion of said first fluidized bed furnace; a first reducing gas supply pipe connected to a bottom of said first fluidized bed furnace for supplying the off-gas of said third fluidized bed furnace to use the gas as a reducing gas; a first charging pipe connected to a side wall of said first fluidized bed furnace for supplying a fine iron ore and a flux from said charging hopper; a first discharge pipe connected to a side wall of said first furnace for discharging pre-reduced intermediate/coarse iron ores; and a first circulation pipe connected to a same side wall of said first furnace for circulating a pre-reduced fine iron ore;

said second fluidized bed furnace consisting of an expanded portion, a tapered portion and a narrow portion; a second gas distributor being installed within a lower portion of said narrow portion; a second reducing gas supply pipe connected to a bottom of said second fluidized bed furnace for supplying an off-gas for said third fluidized bed furnace for use as a reducing gas; said first circulation pipe connected to a side wall of said narrow portion of said second furnace, for supplying discharged fine ore particles from said first fluidized bed furnace, and for supplying a fine iron ore from said first cyclone; a second discharge pipe connected to a side wall of said narrow portion, for discharging pre-reduced fine iron ore; and said expanded portion connected through a first off-gas discharging pipe to said first cyclone;

a second circulation pipe connected to a bottom of said first cyclone for circulating a fine iron ore back to said second fluidized bed furnace; a second off-gas discharging pipe connected to a top of said first cyclone; and said second circulation pipe connected to said first circulation pipe;

said third fluidized bed furnace comprising an expanded portion, a tapered portion and a narrow portion; a third gas distributor installed within a lower portion of said narrow portion; a third reducing gas supply pipe connected to a bottom of said third fluidized bed furnace for supplying a reducing gas; a second charging pipe connected to a side wall of said narrow portion, for supplying a first pre-reduced iron ore from said first and second fluidized bed furnaces; a reduced iron discharging pipe connected to a same side wall, for discharging a finally reduced iron; said second charging pipe communicating to both said first discharging pipe of said first fluidized bed furnace and to said second discharging pipe of said second fluidized bed furnace; and said expanded portion connected through a third off-gas discharging pipe to said second cyclone;

a third circulation pipe connected to a bottom of said second cyclone, for circulating a fine iron ore back to said third fluidized bed furnace; a fourth off-gas discharging pipe connected to a top of said second cyclone for discharging a gas after its separation from the fine iron ore; and said fourth off-gas discharging pipe communicating to both a first gas supply pipe of said first fluidized bed furnace and to a second gas supply pipe of said second fluidized bed furnace; and said gas reforming system communicating through a reformed gas supplying pipe to said fourth off-gas discharging pipe, and communicating through an off-gas discharging pipe to said second off-gas discharging pipe.

2. The two-step fluidized bed pre-reduction apparatus as claimed in claim 1, wherein said first fluidized bed furnace has a height 10–20 times as big as an inside diameter of said first fluidized bed furnace.

3. The two-step fluidized bed pre-reduction apparatus as claimed in claim 1, wherein inside diameters of said narrow portions of said second and third fluidized bed furnaces are exactly as large as inside diameters of bottoms of said tapered portions; inside diameters of said expanded portions of said second and third fluidized bed furnaces are exactly the same as inside diameters of tops of said tapered portions; inside diameters of said expanded portions are 1.5–2.0 times as large as inside diameters of said narrow portions; overall heights of said second and third fluidized bed furnaces are 15–25 times as large as inside diameters of said narrow portions; and heights of said narrow portions are 1.0–1.5 times as high as heights of said expanded portions.

4. A method for pre-reducing a fine iron ore having a wide particle size distribution by using a two-step fluidized bed pre-reduction apparatus comprising the steps of:

providing a two-step fluidized bed pre-reduction apparatus according to claim 1;

providing a gas velocity within the first fluidized bed type furnace at a level 1.2–3.5 times as high as a minimum fluidization velocity of an iron ore staying within said furnace; and regulating gas velocities within the second and third fluidized bed furnaces at a level 1.2–3.5 times as high as a minimum fluidization velocity of iron ore staying within said furnaces.

5. The method as claimed in claim 4, wherein said first fluidized bed furnace has a height 10–20 times as large as an inside diameter thereof.

6. The method as claimed in claim 4, wherein the inside diameters of said narrow portions of said second and third fluidized bed furnaces are exactly as large as inside diameters of bottoms of tapered portions; inside diameters of expanded portions of said second and third fluidized bed furnaces are exactly the same as inside diameters of tops of said tapered portions; inside diameters of said expanded portions are 1.5–2.0 times as large as inside diameters of said narrow portions; overall heights of said second and third fluidized bed furnaces are 15–25 times as large as inside diameters of said narrow portions; and heights of said narrow portions are 1.0–1.5 times as high as heights of said expanded portions.

* * * * *

UNITED STATES PATENT AND TRADEMARK OFFICE
CERTIFICATE OF CORRECTION

PATENT NO.   : 6,235,079 B1                                            Page 1 of 1
DATED        : May 22, 2001
INVENTOR(S)  : Nag Joon Choi et al.

It is certified that error appears in the above-identified patent and that said Letters Patent is hereby corrected as shown below:

Title page,
Item [56] References Cited, FOREIGN PATENT DOCUMENTS, third reference, "96-210446" should read -- 96-21045 --.

Column 5,
Line 40, "ill" should read -- will --.

Column 6,
Line 24, after "flown" insert comma (,).

Signed and Sealed this

Eleventh Day of December, 2001

Attest:

*Attesting Officer*

NICHOLAS P. GODICI
*Acting Director of the United States Patent and Trademark Office*